S. GOODMAN.
INNER TUBE GUARD FOR PNEUMATIC TIRES.
APPLICATION FILED DEC. 13, 1911.
1,047,204.
Patented Dec. 17, 1912.
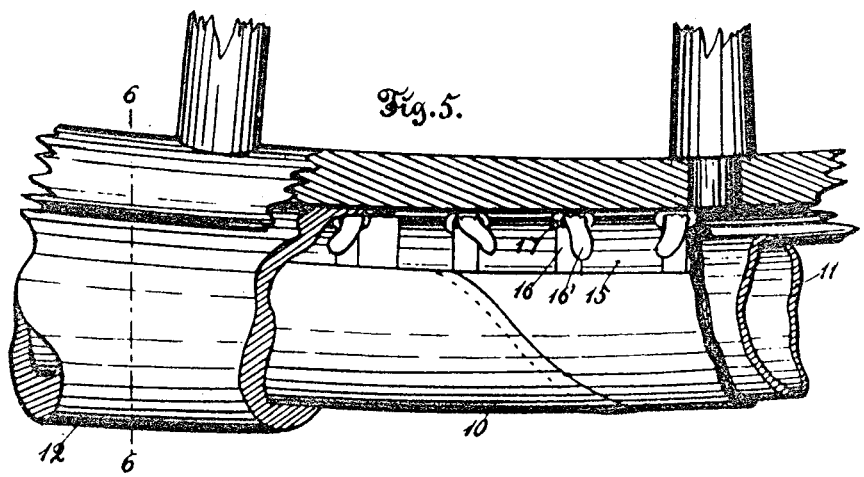
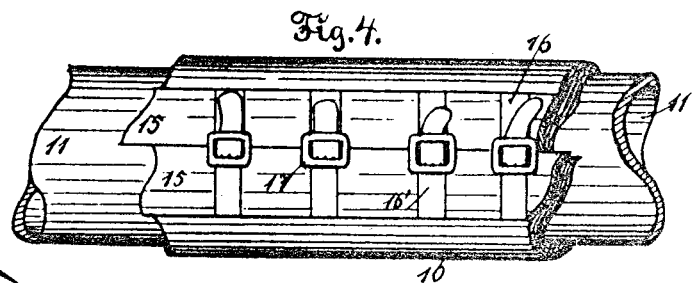
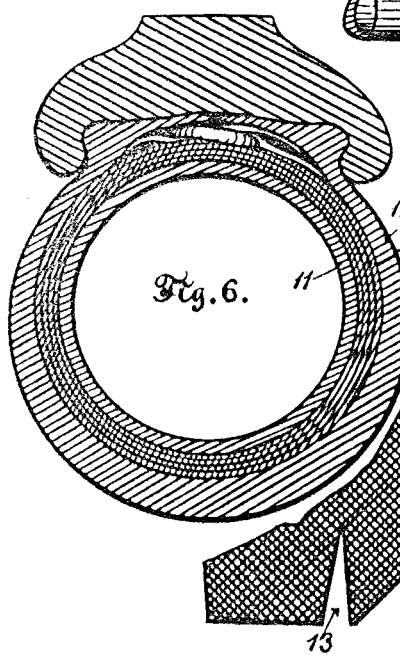
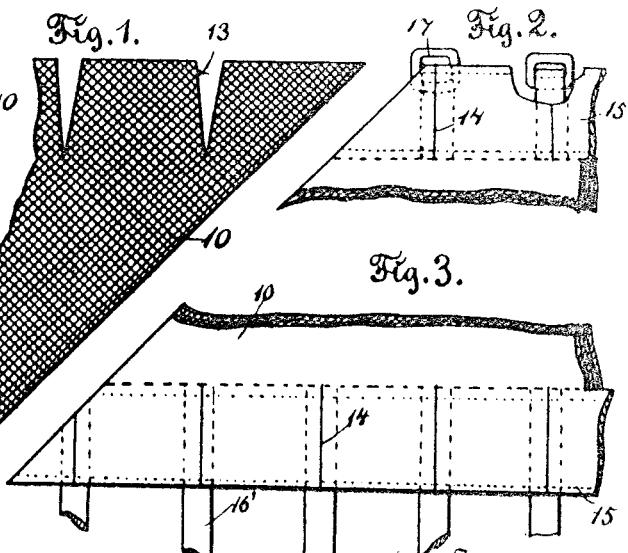

UNITED STATES PATENT OFFICE.

SIEGFRIED GOODMAN, OF BAYONNE, NEW JERSEY.

INNER-TUBE GUARD FOR PNEUMATIC TIRES.

1,047,204.  Specification of Letters Patent.  Patented Dec. 17, 1912.

Application filed December 13, 1911. Serial No. 665,419.

*To all whom it may concern:*

Be it known that I, SIEGFRIED GOODMAN, a subject of the Czar of Russia, and a resident of Bayonne, in the county of Hudson and State of New Jersey, have invented a new and useful Improvement in Inner-Tube Guards for Pneumatic Tires, of which the following is a specification.

This invention relates to improvements in tires, such as are commonly used on the wheels of automobiles, motor-cycles and like vehicles, and particularly to that class of tires comprising an outer tread surface, of relatively strong elastic material, and an inner tubular member adapted to be inflated and upon which the resilience and easy riding qualities of the vehicle depend.

The object of this invention is to prevent "blow-outs" at weakened spots in the outer tires and also largely avoid punctures in the inner tube. These objects are attained by the novel structure and disposition of parts hereinafter fully described and shown in the accompanying drawings forming part of this specification and in which:—

Figure 1, is a developed plan view of a portion of a casing unit. Fig. 2, is a sectional view of a unit portion showing the band and straps. Fig. 3, is a similar view of the same, showing the opposite edge. Fig. 4, is a fragmentary view of an inner tube and casing looking from the side opposite the tread surface. Fig. 5, is a partial side view and section of a wheel rim complete with tire, inner tube and casing, and, Fig. 6, is a cross section of the same taken on line 6—6 of Fig. 5.

It is known that when the outer tire becomes worn in places by service resulting in abrasion or cuts that the pressure in the highly inflated inner tube attacks these weakened spots causing bulges to protrude beyond the surface of the tire, which, coming in contact with rough or sharp-edged impediments burst, thereby deflating the tire and putting the wheel out of use until repairs have been made. It is also known that attempts have been made to remedy this trouble by means of the interposition of shields or guards, but which lack the peculiar advantages of this device.

The invention consists of a casing 10 for the inner tube 11 adapted to be disposed between it and the outer tire 12 and comprises a composite endless strip, formed of several layers of strong woven fabric, such as canvas, each unit of which is cut diagonally or on the bias, so that the casing may be stretched or expanded without rupture and which will also contract when the pressure is removed.

In order to obtain the length necessary to form a complete casing several of these units may be connected at their selvaged edges as cut from the sheet, the seams or joints being so formed as in no manner to interfere with its application or use, the seams being arranged helically about the inner tube without ridges and in such manner that each is covered or overlaid by a portion of an adjacent strip unit so that the seams are not oppositely disposed.

Along both edges of the composite strip are V shaped cut-outs or notches 13 extending inwardly, and of such size and frequency as may be necessary to permit of obtaining the proper shape when the edges of the incised notches are brought together as at 14. Over the edges or margins of the strip, bands 15, which are also cut obliquely to the weaving, are secured by stitching, or other equivalent substantial means, to keep the casing in its proper shape with the edges of the notches in contact and prevent them from spreading or separating.

Straps 16 and 16' are arranged in pairs on each side of the casing, one end of which is secured over the bands 15, at the point of juncture at each incised notch, while the other end is made of adequate length to pass over the inner tube, these straps are provided with securing means, such as buckles 17, fastened to the straps 16 on one side of the casing, while the opposite straps 16' are adapted to engage with the buckles holding the casing securely around the inner tube, which it completely incloses.

In operation the inner tube may be partially inflated, the casing or center guard arranged about it and strapped in position, then all of the air let out, the casing put into the outer tire, the whole placed on a wheel and then the inner tire fully inflated in the usual manner.

As the fabric of the casing and bands is cut obliquely to the weave, or disposition of the warp and woof, it is capable of considerable contraction and expansion in correspondence with the inner tube, but prevents the same from extrusion through or into the tread portion of the tire should an opening or cavity exist therein and thus obviates blow-outs besides materially shielding the inner tube from punctures by reason of its strength; yet the resistance of the material against objects forcibly presented to it does not injure its suppleness or quality of conformation to the tires.

Having thus described my invention, what I claim as new and desire to secure by Letters Patent, is:

In a device of the class described, a composite casing formed of superimposed strips of textile fabric cut diagonally to the weave thereof and having V shaped incisions formed at both edges, said edges being brought together, bands secured adjacent to each of the edges of said casing holding the edges of the incisions in intimate contact, thereby forming a hollow circular casing, and straps arranged in pairs on said bands over the joints at said incisions to form a closure.

In testimony whereof, I have signed my name to this specification in the presence of two subscribing witnesses.

SIEGFRIED GOODMAN.

Witnesses:
DANIEL W. RANTINE,
HILDA L. LIFSCHITZ.